United States Patent
Kozlowski et al.

(10) Patent No.: US 7,371,181 B2
(45) Date of Patent: May 13, 2008

(54) SEALING SYSTEM FOR CONSTANT VELOCITY JOINT

(75) Inventors: Keith A. Kozlowski, El Paso, TX (US); Federico Villalobos, Chihuahua (MX); Sergio Molinar, Chihuahua (MX); Dennis R. Hansen, Freeland, MI (US); Jerry L. Eaton, Hemlock, MI (US)

(73) Assignee: Delphi Technologies, Inc., Troy, MI (US)

( * ) Notice: Subject to any disclaimer, the term of this patent is extended or adjusted under 35 U.S.C. 154(b) by 233 days.

(21) Appl. No.: 10/901,710

(22) Filed: Jul. 29, 2004

(65) Prior Publication Data

US 2005/0054453 A1    Mar. 10, 2005

Related U.S. Application Data

(60) Provisional application No. 60/491,958, filed on Aug. 1, 2003.

(51) Int. Cl.
*F16D 3/84* (2006.01)

(52) U.S. Cl. ..................................... 464/175

(58) Field of Classification Search ............... 464/145, 464/146, 173, 175, 906; 277/634–636; 403/50, 51
See application file for complete search history.

(56) References Cited

U.S. PATENT DOCUMENTS

| | | | | |
|---|---|---|---|---|
| 2,308,073 A | * | 1/1943 | Hagerty | 464/175 |
| 2,386,754 A | * | 10/1945 | Sayder | 464/175 |
| 2,442,640 A | * | 6/1948 | Dunn | 464/175 |
| 2,617,278 A | * | 11/1952 | Sindelar | 464/175 |
| 2,755,641 A | * | 7/1956 | Dunn | 464/175 |
| 3,204,427 A | * | 9/1965 | Dunn | 464/175 |
| 3,381,987 A | | 5/1968 | Husen | |
| 4,564,988 A | | 1/1986 | Norrod | |
| 4,786,272 A | | 11/1988 | Baker | |
| 4,895,550 A | | 1/1990 | Baker | |
| 4,996,765 A | | 3/1991 | Maruyama et al. | |
| 5,116,293 A | | 5/1992 | Reuter | |
| 5,145,191 A | * | 9/1992 | Stewart et al. | 277/636 |
| 5,176,390 A | | 1/1993 | Lallement | |

(Continued)

FOREIGN PATENT DOCUMENTS

DE    2714983    * 10/1978  ................. 464/175

*Primary Examiner*—Greg Binda
(74) *Attorney, Agent, or Firm*—Michael D. Smith

(57) ABSTRACT

An apparatus and method that can be applied, for example, to seal a constant velocity joint. In a first aspect, a primary boot having a body defining a substantially smooth interior surface and a secondary boot associated with the primary boot and spaced from the interior surface. In a second aspect, a constant velocity joint having an outer joint member, an inner joint member positioned in the outer joint member, a plurality of ball members positioned between said outer and inner joint members, and a shaft engaged with and extending from the inner joint member. The primary boot is fixedly associated with respect to the outer joint member and slidably associated with said shaft. In a third aspect, a method comprising the steps of substantially sealing the constant velocity joint with the primary boot which includes first and second ends, fixedly associating the first end of the primary boot with the constant velocity joint, and slidably associating the second end of the primary boot with the shaft which extends from the constant velocity joint.

10 Claims, 4 Drawing Sheets

U.S. PATENT DOCUMENTS

| | | |
|---|---|---|
| 5,222,746 A | 6/1993 | Van Steenbrugge |
| 5,222,914 A | 6/1993 | Mazziotti |
| 5,236,394 A | 8/1993 | Collins et al. |
| 5,295,914 A | 3/1994 | Milavec |
| 5,297,996 A * | 3/1994 | Draga ........................ 464/175 |
| 5,312,300 A * | 5/1994 | McGregor et al. .......... 464/175 |
| 5,328,146 A | 7/1994 | Lin |
| 5,368,523 A | 11/1994 | Mazziotti |
| 5,558,072 A | 9/1996 | Harima et al. |
| 5,725,433 A * | 3/1998 | Kudo et al. ................. 464/175 |
| 5,833,542 A * | 11/1998 | Harrold et al. ............. 464/175 |
| 6,093,108 A * | 7/2000 | Moulinet .................... 464/175 |
| 6,133,928 A | 10/2000 | Kayashima et al. |
| 6,139,027 A | 10/2000 | Biekx |
| 6,250,342 B1 | 6/2001 | Lonardelli |
| 6,264,568 B1 * | 7/2001 | Frazer et al. |
| 6,276,837 B1 | 8/2001 | Iwano |
| 6,293,873 B1 | 9/2001 | Iwano et al. |
| 6,319,132 B1 | 11/2001 | Krisher |
| 6,386,551 B1 | 5/2002 | Martin |
| 6,443,845 B1 | 9/2002 | Hiraga et al. |
| 6,459,470 B1 | 10/2002 | Iwano et al. |
| 6,491,279 B1 | 12/2002 | Iwano et al. |
| 2001/0007832 A1 | 7/2001 | Takabe |
| 2002/0094875 A1 | 7/2002 | Kudo et al. |
| 2002/0147052 A1 | 10/2002 | Cheney et al. |
| 2002/0160843 A1 | 10/2002 | Suzuki et al. |
| 2002/0185825 A1 | 12/2002 | Miyamoto et al. |
| 2003/0047883 A1 | 3/2003 | Imazu et al. |
| 2003/0060293 A1 | 3/2003 | Iwano et al. |
| 2003/0069075 A1 | 4/2003 | Furuta |
| 2003/0102638 A1 | 6/2003 | Iwano |

* cited by examiner

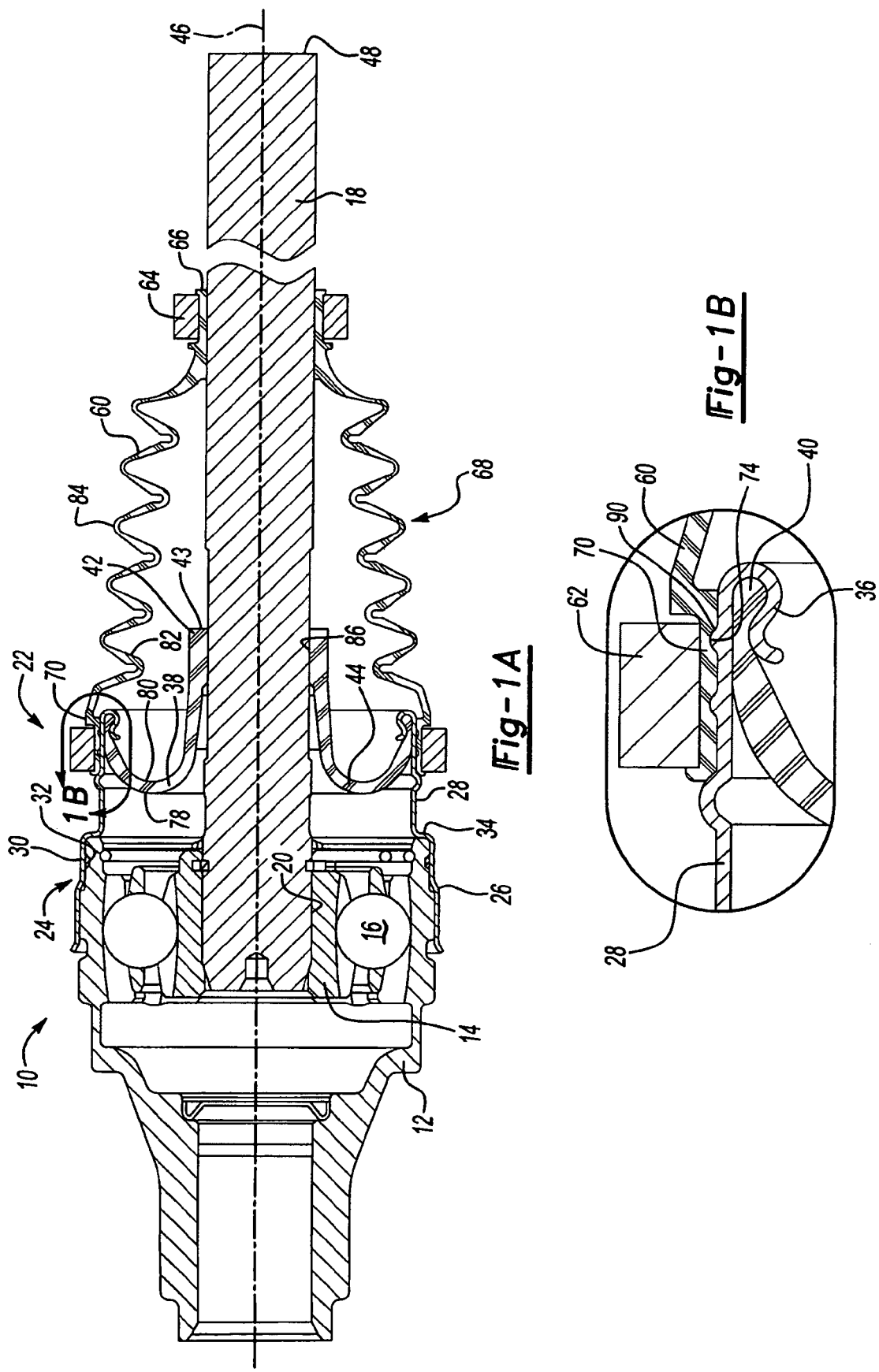

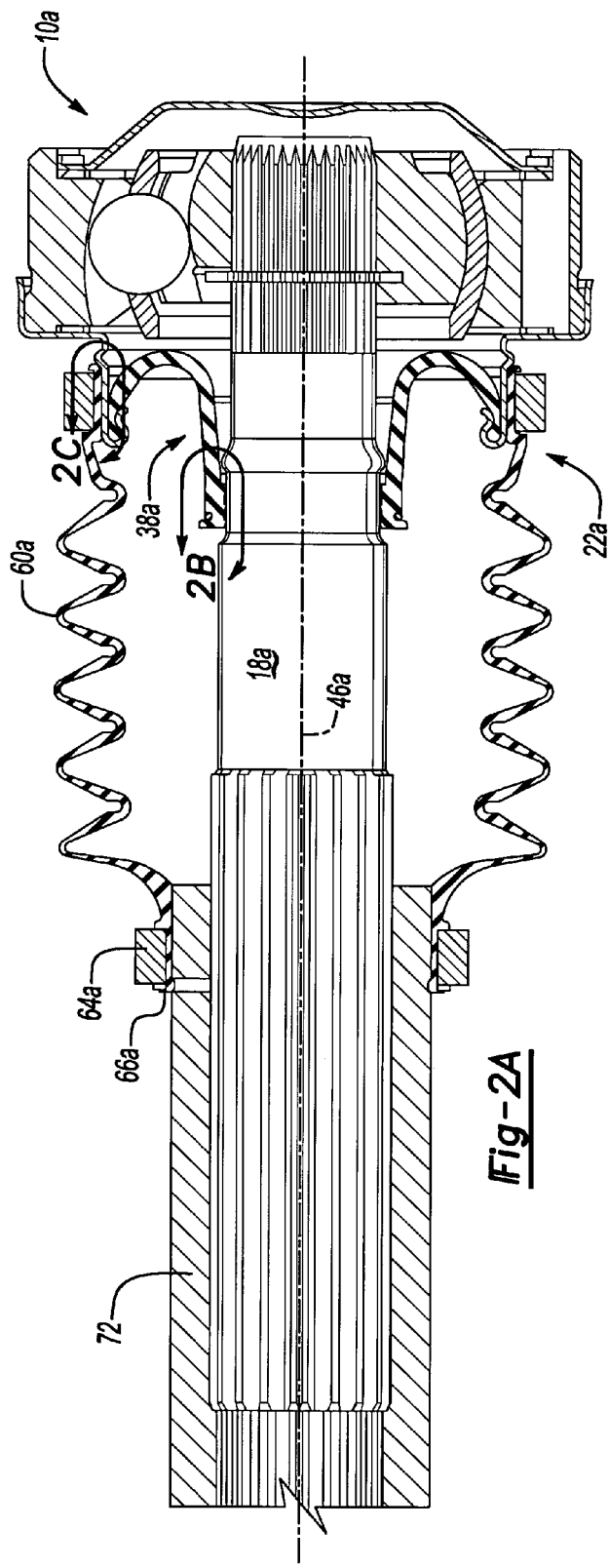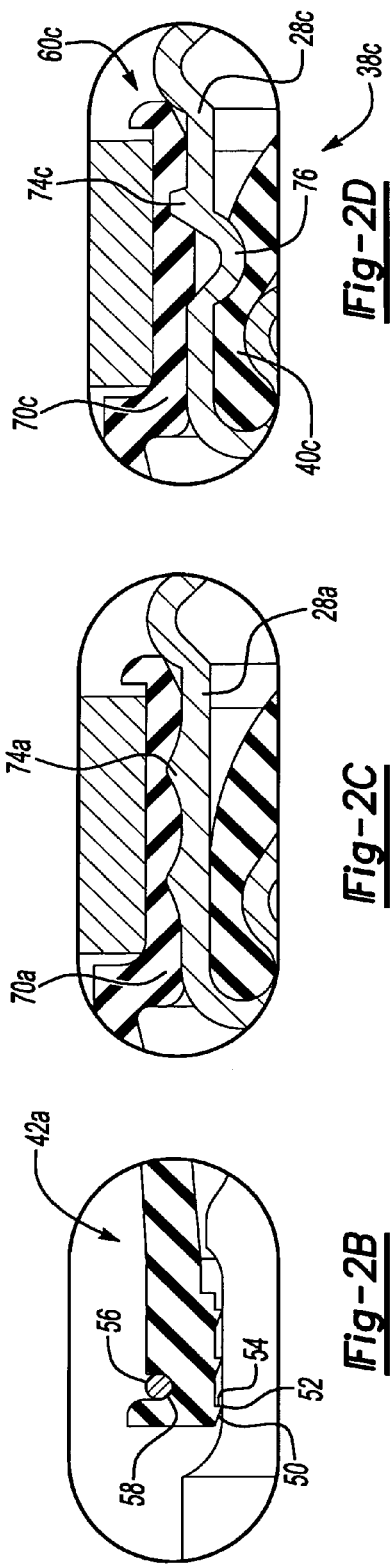
Fig-2A
Fig-2B
Fig-2C
Fig-2D

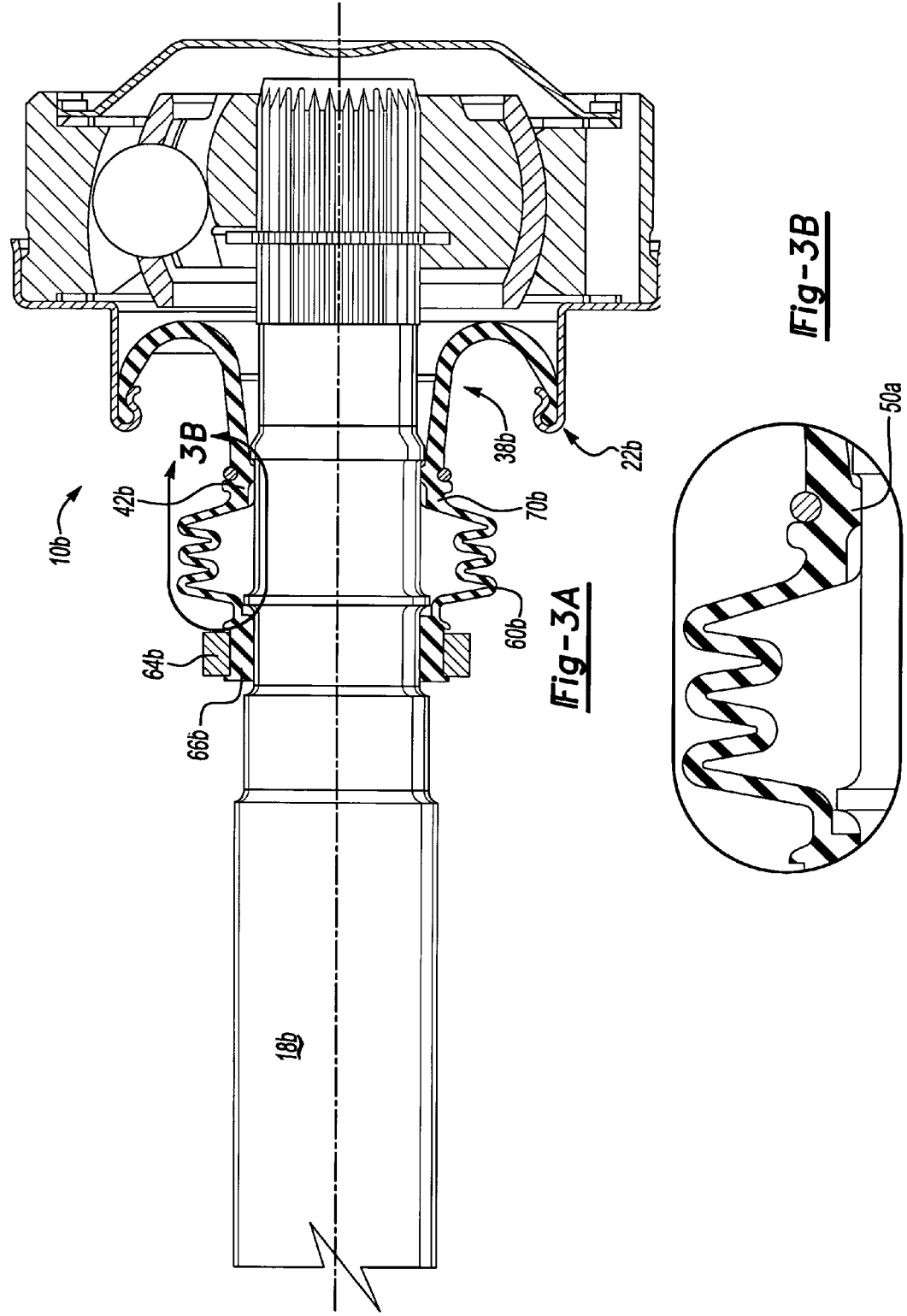

SEALING SYSTEM FOR CONSTANT VELOCITY JOINT

CROSS-REFERENCE TO RELATED APPLICATIONS

This application claims the benefit of U.S. provisional patent application Ser. No. 60/491,958 for an IMPROVED SEALING SYSTEM FOR HIGH SPEED APPLICATIONS, filed on Aug. 1, 2003, which is hereby incorporated by reference in its entirety. This claim is made under 35 U.S.C. § 119(e); 37 C.F.R. § 1.78; and 65 Fed. Reg. 50093.

FIELD OF THE INVENTION

The present invention relates to a boot for sealing a constant velocity joint.

BACKGROUND OF THE INVENTION

A constant velocity joint communicates rotation between two parts. The respective longitudinal axes of the parts can be angled with respect to one another. The constant velocity joint includes an outer joint member and an inner joint member, with the inner joint member being disposed least partially within the outer joint member. A plurality of torque transmitting rollers or balls are positioned substantially between the inner and outer joint members and transmit torque between the joint members through a joint angle. A driver shaft, such as a propeller shaft or a half shaft, can be mounted to one of the joint members, such as the inner joint member. A seal boot can be mounted on the outer joint member at one end and connected to the shaft at the opposite end to seal lubricant within the constant velocity joint and exclude debris from entering the joint. Known seal boots are fixed, such as by clamping to the shaft, to preclude relative axial movement between the shaft and the boot.

SUMMARY OF THE INVENTION AND ADVANTAGES

The invention provides an apparatus and method that can be applied, for example, to seal a constant velocity joint. In a first aspect, the invention includes a primary boot having a body defining a substantially smooth interior surface and a secondary boot associated with the primary boot and spaced from the interior surface. In a second aspect, the invention includes a constant velocity joint having an outer joint member, an inner joint member positioned in the outer joint member, a plurality of ball members positioned between said outer and inner joint members, and a shaft engaged with and extending from the inner joint member. The primary boot is fixedly associated with respect to the outer joint member and slidably associated with said shaft. In a third aspect, the invention includes a method comprising the steps of substantially sealing the constant velocity joint with the primary boot which includes first and second ends, fixedly associating the first end of the primary boot with the constant velocity joint, and slidably associating the second end of the primary boot with the shaft which extends from the constant velocity joint.

The invention provides an apparatus and method that provides the advantages of prior art seals and eliminates at least some of the disadvantages. For example, the exemplary embodiments of the invention provide a primary boot formed as a rolling boot that limits evacuation of lubricant from the joint while concurrently reducing the likelihood that lubricant will accumulate on the boot, a problem associated with convoluted boots. However, the slideable engagement between the rolling boot and the shaft allows for increased axial movement of the shaft relative to prior art seals. The slideable engagement also eliminates the necessity of venting the joint since the rolling boot can expand along the length of the shaft as necessary to accommodate changes in the internal pressure of the joint. The secondary boot is convoluted boot and reduces the likelihood of debris interfering with the slideable engagement between the rolling boot and the shaft.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a cross-sectional view of a constant velocity joint including a sealing arrangement according to an exemplary embodiment of the present invention;

FIG. 1B is an enlarged view from FIG. 1A taken along section line 1B showing the sealing engagement between a secondary boot and a seal adapter and the sealing engagement between the seal adapter and a rolling diaphragm boot;

FIG. 2A is a staggered cross-sectional view of a constant velocity joint taken along section lines 2A-2A in FIG. 2E showing a sealing arrangement according to a second exemplary embodiment of the present invention;

FIG. 2B is an enlarged view from FIG. 2A taken along section line 2B showing the sealing engagement between a rolling diaphragm boot and a shaft;

FIG. 2C is an enlarged view from FIG. 2A taken along section line 2C showing the sealing engagement between a secondary boot and a seal adapter as well as the sealing engagement between the seal adapter and the rolling diaphragm boot;

FIG. 2D is an alternative embodiment of the invention corresponding to the view in FIG. 2C showing an annular notch in the seal adapter;

FIG. 3A is a staggered cross-sectional view of a constant velocity joint taken along sections lines 3A-3A in FIG. 3E showing a seal arrangement according to a third exemplary embodiment of the present invention;

FIG. 3B is an enlarged view from FIG. 3A taken along section line 3B showing the sealing engagement between a rolling diaphragm boot and a shaft, as well as showing a secondary boot formed integral with the rolling diaphragm boot.

DETAILED DESCRIPTION OF THE PREFERRED EMBODIMENT

Figure 2E:
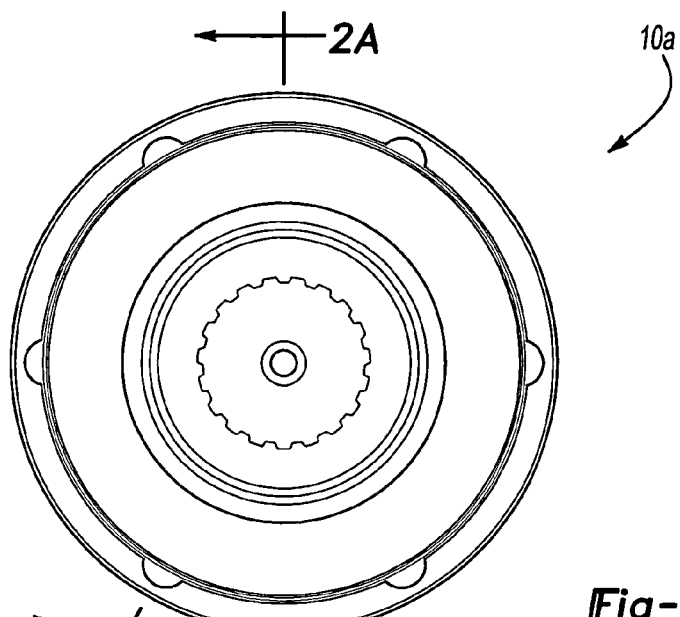
FIG. 2E is a side view of the constant velocity joint shown in FIG. 2A.

A plurality of different embodiments of the invention are shown in the Figures of the application. Similar features are shown in the various embodiments of the invention. Similar features have been numbered with a common reference numeral and have been differentiated by an alphabetic designation.

Referring to FIG. 1A, a constant velocity joint 10 is shown having an outer joint member 12 and an inner joint member 14. A plurality of rollers 16 or torque transmitting balls are disposed between the outer and inner joint members 12, 14. Rotation of one of the joint members 12, 14 is communicated to the other joint member 12, 14 by balls 16.

A shaft 18 can be engaged with the inner joint member 14. Shaft 18 can be inserted in an aperture 20 of the inner joint member 14. Shaft 18 can rotate the inner joint member 14 to rotate the outer joint member 12, or vice-versa. Shaft 18 can be a propeller shaft or a half shaft. The shaft 18 can move or plunge along its axis 46 relative to the inner joint member 14.

The engagement between the shaft 18 and the inner joint member 14, as well as the engagement between the inner joint member 14 and the outer joint member 12, is enhanced by lubricant. In operation, the temperature of the lubricant can increase in response to the angular velocity of the rotating parts. Also, the cooperative movement between the parts can cause the lubricant to become dislodged from the constant velocity joint 10.

The constant velocity joint 10 can include a boot assembly 22 to prevent lubricant from evacuating the joint 10. The boot assembly 22 can include a seal adapter 24 having a first substantially cylindrical portion 26 and a second substantially cylindrical portion 28. The first cylindrical portion 26 can engage the outer joint member 12. The portion 26 can be immovably associated with the member 12. Unlike prior art seal adapters, it is not necessary that the first cylindrical portion 26 define communication passages for venting the constant velocity joint 10. The first cylindrical portion 26 can be sealed with respect to the outer joint member 12 with an O-ring 30 disposed in a groove 32; the groove 32 defined by the outer joint member 12.

The second cylindrical portion 28 can extend from the first cylindrical portion 26 away from the outer joint member 12 to encircle the shaft 18. A step portion 34 can be defined between the first cylindrical portion 26 and the second cylindrical portion 28. The second cylindrical portion 28 includes an inner surface 88 and an outer surface 90. A folded-over interior lip 36 can extend from the second cylindrical portion 28 toward the outer joint member 12.

The boot assembly 22 can also include a primary or rolling diaphragm boot or "J" boot 38 having a trumpet-shaped body 44. The boot 38 defines a substantially smooth interior surface 78 and can include a first end 40 pressed between the lip 36 and the second cylindrical portion 28. The boot also includes an exterior surface 80 and a second end 42 with an inwardly-facing annular surface 86 in sealing engagement with the shaft 18. The second end 42 also includes an end face 43 that opposes outer joint member 12. The body 44 can extend between the first end 40 and the second end 42. The second end 42 of the boot 38 can slide along a path of movement defined along a length of the shaft 18. For example, during movement of the shaft 18 relative to the inner joint member 14, the boot 38 can remain substantially unaltered or un-stretched as the shaft 18 moves. In addition, under operating conditions wherein an internal pressure of the constant velocity joint 10 increases, the boot 38 can be pressed outwardly toward the distal end 48 of the shaft 18. During the outward movement of the boot 38, the second end 42 can slide along a length of the shaft 18 toward the distal end 48. During movement of the second end 42 along the shaft 18, the second end 42 remains in sealing engagement with the shaft 18.

Referring now to FIGS. 2A and 2B, a rolling diaphragm boot 38*a*, can include one or more inwardly projecting annular ribs 50 extending from a second end 42*a*. The rib 50 can define a scrapping edge 52 for enhancing the removal of lubricant from a shaft 18*a* and directing the lubricant towards a joint 10*a*. The rib 50 can also define a substantially planar surface 54 opposed to the joint 10*a* to enhance the likelihood that the end 42*a* will be directed along the shaft 18*a*, rather than be expanded radially outwardly with respect to shaft 18*a*.

A boot assembly 22*a* including the rolling diaphragm boot 38*a* can also include a spring clip 56 to enhance sealing engagement between the end 42*a* and the shaft 18*a*. The end 42*a* can define a groove 58 for receiving the spring clip 56. The spring clip 56 is configured to slightly press the end 42*a* radially inwardly toward shaft 18*a* to enhance sealing. However, the spring clip 56 is configured so as to not prevent or substantially inhibit sliding movement of the end 42*a* relative to the shaft 18*a*.

Figure 3C:
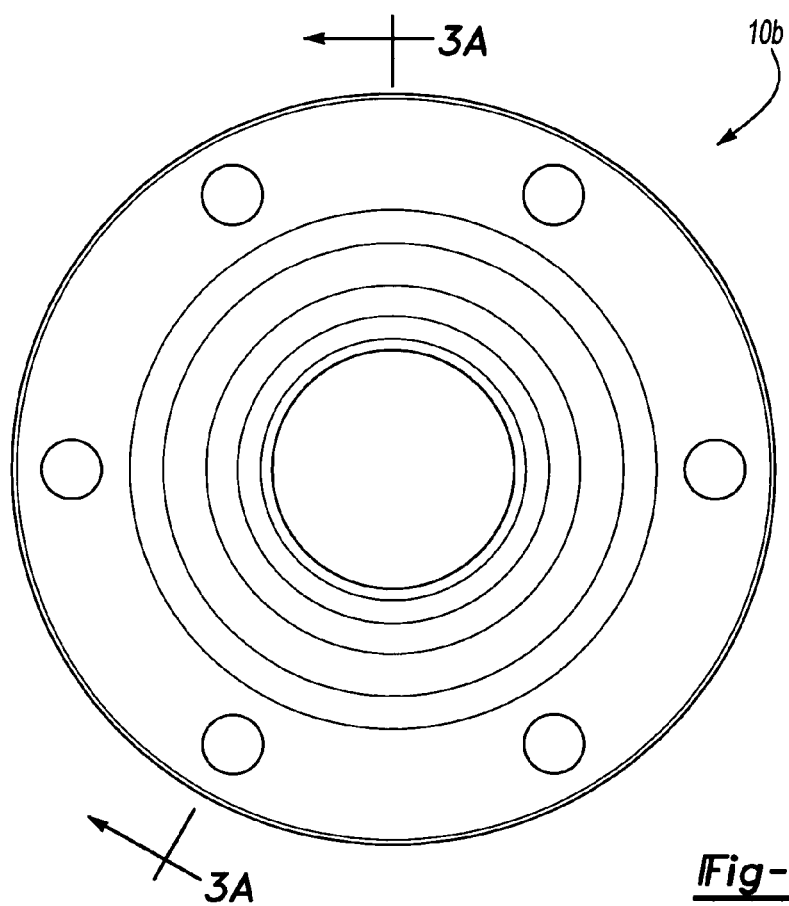
FIG. 3C is a side view of the constant velocity joint shown in FIG. 3A.

Referring now to FIGS. 3A-3C, a joint 10*b* includes a boot assembly 22*b* having a rolling diaphragm boot 38*b* with a second end 42*b* in sealing engagement with a shaft 18*b*. A rib 50*a* can extend from the end 42*b* to enhance sealing engagement between the end 42*b* and the shaft 18*b*. The rib 50*a* can define a substantially rectangular cross-section.

Referring now to FIGS. 1A and 1B, the boot assembly 22 can also include a secondary boot 60. The secondary boot 60 is spaced from the interior surface 78 and can be in sealing engagement with an outer surface of the seal adapter 24. The secondary boot 60 includes a convoluted body 84. The primary and secondary boots 38, 60 are coaxial. In the first and second exemplary embodiments of the invention, the secondary boot 60, 60*a* substantially encloses the primary boot 38, 38*a*. In other words, the secondary boot 60, 60*a* and the primary boot 38, 38*a* are radially spaced from one another. An interior surface 82 of the secondary boot 60 faces the exterior surface 80 of the primary boot 38. In the third exemplary embodiment of the invention, the secondary boot 60*b* is axially spaced adjacent to the primary boot 38*b*. A clamp 62 can immovably or fixedly associate a first end 70 of the secondary boot 60 with respect to the seal adapter 24. The second substantially cylindrical portion 28 can define one or more annular ribs 74 engaging the first end 70 to enhance sealing, best shown in FIG. 1B. A clamp 64 can compress a second end 66 of the boot 60 to sealingly engage the boot 60 with the shaft 18. The boot 60 can include a convoluted portion 68 between the first end 70 and the second end 66. The clamp 64 can fixedly associate the second end 66 of the boot 60 with the shaft 18. The boot 60 can enclose the boot 38. The boot 60 can enclose the length of travel of the end 42 along the shaft 18.

As shown in FIG. 2A, the shaft 18*a* of the constant velocity joint 10*a* can be associated with a slip spline and be moveable along its axis 46*a* in a tube 72. A second end 66*a* of a secondary boot 60*a* can be fixedly associated with the tube 72 with a clamp 64*a*. FIG. 3A shows a secondary boot 60*b* integrally formed with the boot 38*b*. The boot 60*b* includes a first end 70*b* integral with the end 42*b* and a second end 66*b* fixedly associated with the shaft 18*b* with a clamp 64*b*.

As shown in FIG. 2C, a second substantially cylindrical portion 28*a* of the joint 10*a* defines a plurality of annular ribs 74*a* engaging a first end 70*a* of the secondary boot 60*a* to enhance sealing. In an alternative embodiment of the invention, a second substantially cylindrical portion 28*c* defines a first annular rib 74*c* which extends radially outwardly and engages a first end 70*c* of a secondary boot 60*c* to enhance sealing. The second substantially cylindrical portion 28*c* also defines a second annular rib 76 which extends radially inwardly and engages a first end 40*c* of a rolling boot 38*c* to enhance sealing.

The rolling diaphragm boot 38 can be formed from any pliable material resistant to the operating environment of a constant velocity joint. For example, the boot 38 can be formed from a silicone-based material or a rubber material. The boot 38 and the secondary boot 60 can be formed from different materials or can be formed from the same material. In one embodiment of the invention, the boot 38 can be formed from a silicone-based material and the secondary boot 60 can be formed from a thermoplastic material. The materials used for the respective boots can be selected to optimize the performance of the constant velocity joint, to minimize the cost of the constant velocity joint, or to satisfactorily compromise between performance and cost.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A constant velocity joint assembly comprising:
   an outer joint member;
   an inner joint member;
   means disposed between the outer and inner joint members for the transmittal of torque;
   a shaft engaged with said inner joint member, wherein said shaft has a longitudinal axis, an exterior surface, and a reduced shaft diameter portion extending longitudinally along said exterior surface and defining a path of movement; and
   a boot assembly including:
   a primary boot having a first end and a second end; and
   a secondary boot having a first end and a second end;
   wherein said primary boot second end includes an inwardly-facing annular surface in sealing engagement with said shaft and is adapted to move slidably along said path of movement;
   wherein said secondary boot encloses both said primary boot and said path of movement;
   wherein said secondary boot first end is spaced apart from primary boot first end;
   wherein said secondary boot second end is spaced apart from said primary boot second end; and
   wherein primary boot second end includes an end face opposing said outer joint member.

2. The constant velocity joint assembly of claim 1 wherein said primary and secondary boots are substantially coaxial.

3. The constant velocity joint assembly of claim 2 wherein said primary and secondary boots are radially spaced from one another.

4. The constant velocity joint assembly of claim 2 wherein said primary boot includes an exterior surface and said secondary boot includes an interior surface facing said exterior surface.

5. The constant velocity joint assembly of claim 2 wherein said primary and secondary boots are formed from different material.

6. The constant velocity joint assembly of claim 2 further comprising:
   a substantially cylindrical member defining an inner surface and an outer surface and having an interior lip;
   wherein said primary boot includes a first end disposed between said interior lip and said inner surface; and
   wherein said secondary boot encircles said outer surface spaced apart from said primary boot.

7. The constant velocity joint assembly of claim 2 wherein said primary boot includes a trumpet-shaped body extending between said primary boot first and second ends.

8. The constant velocity joint assembly of claim 2 wherein said primary boot includes a trumpet-shaped body and said secondary boot includes a convoluted body.

9. The constant velocity joint assembly of claim 2 further comprising a seal adapter having:
   a first substantially cylindrical portion sealed to said outer joint member;
   a second substantially cylindrical portion extending from said first substantially cylindrical portion encircling said shaft, wherein said second substantially cylinder portion has a inner surface and an outer surface opposing and spaced apart from said inner surface; and
   a folded-over lip extending from said second substantially cylindrical portion toward said outer joint member, wherein said primary boot first end is pressed between said lip and said inner surface of second substantially cylindrical portion; wherein said secondary boot encircles said outer surface.

10. The constant velocity joint assembly of claim 9 wherein said seal adapter further comprising:
    a plurality of annular ribs extending radially outward from said second substantially cylindrical portion and engages said secondary boot first end; and
    means to secure said secondary boot first end to said annular ribs.

* * * * *